United States Patent
Zhang

(10) Patent No.: US 8,370,129 B2
(45) Date of Patent: Feb. 5, 2013

(54) SYSTEM AND METHODS FOR QUANTITATIVE ASSESSMENT OF INFORMATION IN NATURAL LANGUAGE CONTENTS

(76) Inventor: Guangsheng Zhang, Palo Alto, CA (US)

(*) Notice: Subject to any disclaimer, the term of this patent is extended or adjusted under 35 U.S.C. 154(b) by 675 days.

(21) Appl. No.: 12/573,134

(22) Filed: Oct. 4, 2009

(65) Prior Publication Data

US 2010/0174526 A1 Jul. 8, 2010

Related U.S. Application Data

(60) Provisional application No. 61/143,140, filed on Jan. 7, 2009.

(51) Int. Cl.
*G06F 17/27* (2006.01)
(52) U.S. Cl. ............................................... 704/9
(58) Field of Classification Search ................. 704/9
See application file for complete search history.

(56) References Cited

U.S. PATENT DOCUMENTS

| | | | |
|---|---|---|---|
| 5,930,788 A | 7/1999 | Wical | |
| 6,101,515 A | 8/2000 | Wical | |
| 6,487,545 B1 | 11/2002 | Wical | |
| 2004/0107088 A1* | 6/2004 | Budzinski | 704/10 |

* cited by examiner

*Primary Examiner* — Jakieda Jackson
(74) *Attorney, Agent, or Firm* — SV Patent Service

(57) ABSTRACT

A method is disclosed for quantitatively assessing information in natural language contents related to an object name. The method includes identifying a sentence in a document, determining a subject and a predicate in the sentence, and retrieving an object-specific data set related to the object name. The object-specific data set includes property names and association-strength values. Each property name is associated with an association-strength value. The method also includes identifying a first property name in the property names that matches the subject, assigning a first association-strength value associated with the first property name to the subject, identifying a second property name in the property names that matches the predicate, assigning a second association-strength value associated with the second property name to the predicate, and multiplying the first association-strength value and the second association-strength value to produce a sentence information index.

20 Claims, 5 Drawing Sheets

SYSTEM AND METHODS FOR QUANTITATIVE ASSESSMENT OF INFORMATION IN NATURAL LANGUAGE CONTENTS

CROSS REFERENCES TO RELATED APPLICATIONS

The present application is a Continuation patent application of and claims priority to Provisional Patent Application 61/143,140, titled "System and Methods for Quantitative Assessment of Information in Natural Language Contents" filed by the present inventor on Jan. 7, 2009, the disclosure of which is incorporated herein by reference.

BACKGROUND

The present application relates to information management, and more particularly, to technologies for information identification and quantification in natural language contents, and classification, ranking, searching, and retrieval of such contents.

In the information age, more and more individuals and organizations are faced with the problem of information overload. Accurate and efficient methods for information access, including collection, storage, organization, search and retrieval are the key to the success in this information age.

Much of the information is contained in natural language contents, such as text documents. Various theoretical and practical attempts have been made to efficiently organize and determine the relevancy of the information in natural language contents. The existing techniques, including various search engines and document classification systems, however, are often inaccurate in identifying the information focus in the content, thus often cannot effectively serve the information needs of their users. There is still a need for accurate, efficient, and automated technologies to search, rank, and classify large amounts of natural language contents based on the meaning of the contents, and the amount of information they contain.

SUMMARY

In a general aspect, the present invention relates to a method for quantitatively assessing information in natural language contents. The method includes receiving an object name by a computer processing system, receiving, by the computer processing system, a document containing text in a natural language, identifying a sentence in the document by the computer processing system, determining a subject and a predicate in the sentence by the computer processing system, retrieving an object-specific data set related to the object name from a computer storage system, wherein the object-specific data set includes a plurality of property names and association-strength values, each property name being associated with an association-strength value, identifying a first property name in the plurality of property names that matches the subject, assigning a first association-strength value associated with the first property name to the subject, identifying a second property name in the plurality of property names that matches the predicate, assigning a second association-strength value associated with the second property name to the predicate, and multiplying the first association-strength value and the second association-strength value by the computer processing system to produce a sentence information index as a quantitative measure for the amount of information contained in the sentence about the object name.

In another general aspect, the present invention relates to a method for finding natural-language documents relevant to a search query. The method includes receiving a search query about an object name by a computer processing system, receiving, by the computer processing system, a plurality of documents each containing text in a natural language, retrieving an object-specific data set related to the object name from a computer storage system, wherein the object-specific data set includes a plurality of property names and association-strength values, each property name being associated with an association-strength value, computing a document information index for each of the plurality of documents, wherein the document information index is a quantitative measure for the amount of information contained in the document about the object name, and ranking the plurality of documents by their respective document information indices to produce a search result in response to the search query. The step of computing a document information index can include: identifying a sentence in the document by the computer processing system, determining a subject and a predicate in the sentence by the computer processing system, identifying a first property name in the plurality of property names in the object-specific data set that matches the subject, assigning a first association-strength value associated with the first property name to the subject, identifying a second property name in the plurality of property names in the object-specific data set that matches the predicate, assigning a second association-strength value associated with the second property name to the predicate, multiplying the first association-strength value and the second association-strength value to produce a sentence information index, and calculating the document information index using the sentence information index.

In another general aspect, the present invention relates to a method for classifying text documents in a natural language. The method can include: receiving, by the computer processing system, an object name to be used to classify documents, receiving, by the computer processing system, a plurality of documents each containing text in a natural language, retrieving an object-specific data set related to the object name from a computer storage system, wherein the object-specific data set includes a plurality of property names and association-strength values, each property name being associated with an association-strength value, computing a document information index for each of the plurality of documents, wherein the document information index is a quantitative measure for the amount of information contained in the document about the object name, selecting one or more documents relevant to the object name from the plurality of documents using their respective document information indices, and assigning the one or more documents to a document category related to the object name. The step of computing a document information index can include: identifying a sentence in the document by the computer processing system, determining a subject and a predicate in the sentence by the computer processing system, identifying a first property name in the plurality of property names in the object-specific data set that matches the subject, assigning a first association-strength value associated with the first property name to the subject, identifying a second property name in the plurality of property names in the object-specific data set that matches the predicate, assigning a second association-strength value associated with the second property name to the predicate, multiplying the first association-strength value and the second association-strength value to produce a sentence information index, and calculating the document information index using the sentence information index.

In another general aspect, the present invention relates to a method for quantitatively assessing information in a phrase in relation to an object name. The method can include: receiving an object name by a computer processing system, receiving, by the computer processing system, a phrase in a natural language, identifying a head term in the phrase by the computer processing system, identifying a modifier of the head term in the phrase by the computer processing system, retrieving an object-specific data set related to the object name from a computer storage system, wherein the object-specific data set includes a plurality of property names and association-strength values, each property name being associated with an association-strength value, identifying a first property name in the plurality of property names that matches the head term, assigning a first association-strength value associated with the first property name to the head term, identifying a second property name in the plurality of property names that matches the modifier of the head term, assigning a second association-strength value associated with the second property name to a modifier, and multiplying the first association-strength value and the second association-strength value by the computer processing system to produce a phrase information index as a quantitative measure for the amount of information contained in the phrase about the object name.

In another general aspect, the present invention relates to a method for quantitatively assessing information in a text content in relation to an object name. The method can include: receiving an object name by a computer processing system, retrieving an object-specific data set related to the object name from a computer storage system, wherein the object-specific data set includes a plurality of property names and association-strength values, each property name being associated with an association-strength value, receiving, by the computer processing system, a text content in a natural language, identifying a sentence in the text content, identifying a plurality of component strings in the sentence by the computer processing system, searching for a property name in the plurality of property names that matches at least one of the component strings, assigning an association-strength value associated with the property name to the one of the component strings, averaging, by the computer processing system, the association-strength values assigned to the component strings in the sentence to produce a sentence information index, and calculating an information index for the text content using the sentence information index, wherein the information index is a quantitative measure for the amount of information contained in the text content about the object name.

In yet another general aspect, the present invention relates to a system for quantitatively assessing information in natural language contents. The system can include: a computer processing system that can receive an object name and a document containing text in a natural language, and a computer storage system in communication with the computer processing system and configured to store a object-specific data set related to the object name from wherein the object-specific data set includes a plurality of property names and association-strength values, each property name being associated with an association-strength value. The computer processing system can identify a sentence in the document, determine a subject and a predicate in the sentence, identify a first property name in the plurality of property names that matches the subject, assign a first association-strength value associated with the first property name to the subject, identify a second property name in the plurality of property names that matches the predicate, assign a second association-strength value associated with the second property name to the predicate, and multiply the first association-strength value and the second association-strength value to produce a sentence information index, which is to be used as a quantitative measure for the amount of information contained in the sentence about the object name.

In still another general aspect, the present invention relates to a computer program product comprising a computer useable medium having computer readable program code functions embedded in said medium for causing a computer to receive an object name and a document containing text in a natural language, identifying a sentence in the document, determine a subject and a predicate in the sentence, retrieve an object-specific data set related to the object name from a computer storage system, wherein the object-specific data set includes a plurality of property names and association-strength values, each property name being associated with an association-strength value, identify a first property name in the plurality of property names that matches the subject, assign a first association-strength value associated with the first property name to the subject, identify a second property name in the plurality of property names that matches the predicate, assign a second association-strength value associated with the second property name to the predicate, and multiply the first association-strength value and the second association-strength value to produce a sentence information index as a quantitative measure for the amount of information contained in the sentence about the object name.

Implementations of the system may include one or more of the following. The method can further include computing a document information index using the sentence information index, wherein the document information index is a quantitative measure for the amount of information contained in the document about the object name. The step of computing the document information index can include: computing sentence information indices of a plurality of sentences in the document, wherein the sentence information indices are specific to the object name, and computing the document information index as a function of the sentence information indices. The step of computing the document information index can include summing up the sentence information indices to produce the document information index. The method can further include receiving a query about an object name by the computer processing system, computing document information indices for a plurality of documents, wherein the document information indices each is a quantitative measure for the amount of information contained in the document about the object name, and ranking the plurality of documents by their respective document information indices to produce a search result in response to a query. The method can further include receiving an object name to classify documents by the computer processing system, computing document information indices for a plurality of documents, wherein the document information indices each is a quantitative measure for the amount of information contained in the document about the object name, determining a threshold value for document classification for the object name, and selecting one or more documents relevant to the object name from the plurality of documents by comparing their respective document information indices to the threshold value. The method can further include assigning a zero value to the sentence information index if a property name matching the subject or the predicate is not identified in the plurality of property names in the object-specific data set. The subject or the predicate can include a single word, a string of words, a phrase, or an embedded clause. The step of identifying a sentence in the document can include identifying a complex sentence in the document by the computer processing system, decomposing the complex sentence into one or more simple sentences, wherein a subject and a predicate are identified in each of the simple sentences by the computer processing system, calculating sentence information indices for the one or more simple sentences, and computing a sentence information index for the complex sentence using the sentence information indices for the one or more simple sentences. The subject and the predicate in the sentence can be determined by the computer processing system using a syntactic parser. The object name can include a word, a list of words, a phrase, a character string, a query, a sub-component of a query, a topic, or the name of a document category.

The systems and methods described in the present application can provide accurate, quantitative, and automated technologies for searching, retrieving, ranking, and classifying natural language contents in such a way that is consistent with the meaning and information carried in the content. The disclosed system and methods are based on a novel theoretical framework, which sets it apart from conventional approaches. The disclosed system and methods can assess information quantity in natural language contents, mainly in the form of text documents that are stored on computer readable media. The disclosed system and methods can produce numerical values specific to each text document as a measurement for the amount of information contained in the document. The disclosed system and methods can also produce quantified measurement for the degree of relevancy of a document to a given query, a topic, or a concept.

The disclosed system and methods can significantly improve the accuracy and relevancy ranking for information searching and retrieval. The disclosed system and methods can significantly improve the accuracy for document classification. The disclosed system and methods can provide contextual information for meaning disambiguation in natural language understanding, machine translation, and speech recognition.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

Figure 1:
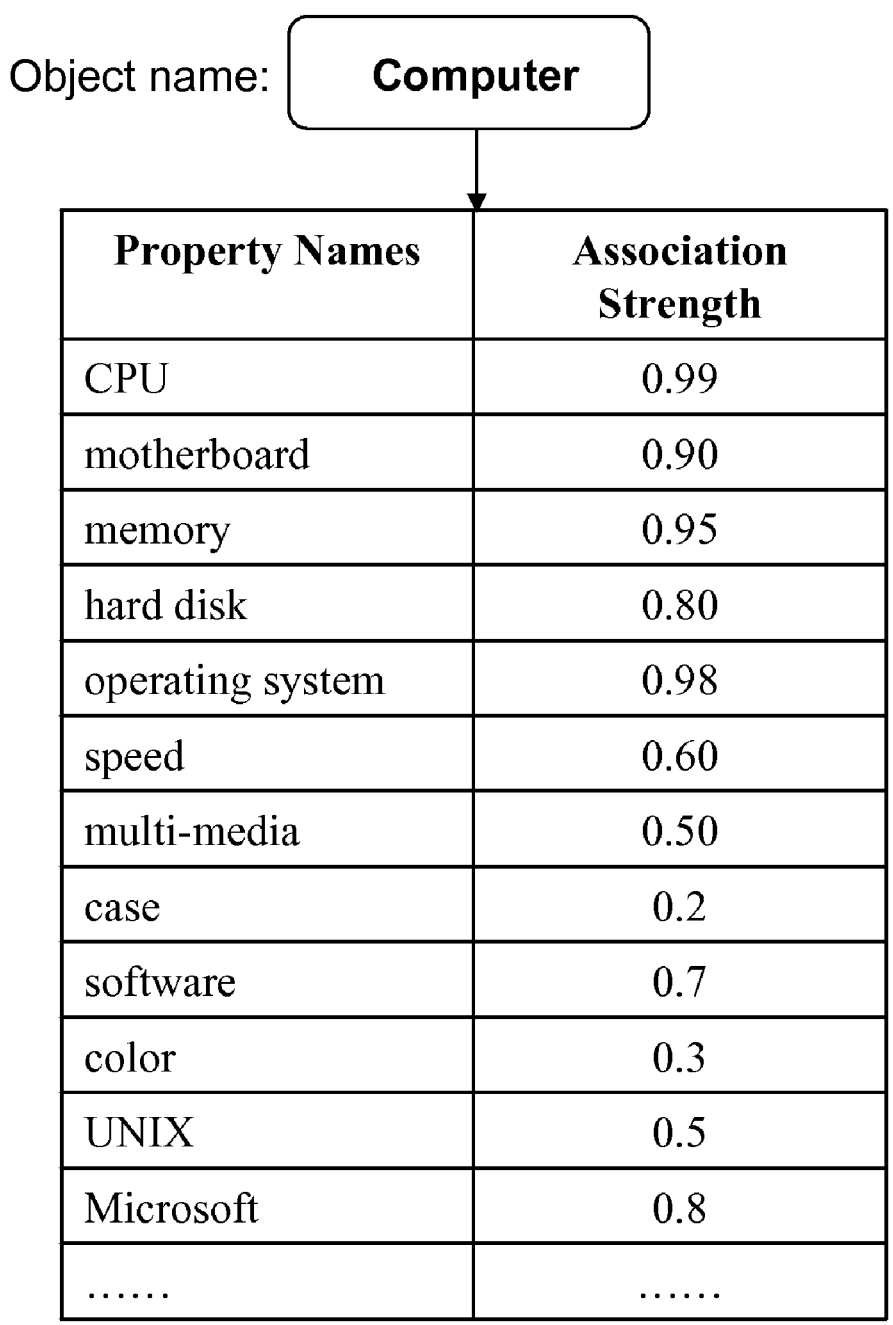
FIG. 1 illustrates an example of an object, its properties and their association strengths associated with the object.

As an example, referring to FIG. 1, an object named "computer" is characterized by a plurality of associated properties such as "CPU", "motherboard", "memory", "hard disk", "operating system" . . . that are associated with the object "computer". The prominence of the association between "computer" and each of the properties is characterized by a numerical value herein called association strength. Hypothetical values for the association strengths for "CPU", "motherboard", "memory", "hard disk", "operating system" . . . can for example respectively be 0.99, 0.90, 0.95, 0.80, 0.98 . . . . . A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, an abstract object, and can be represented by a symbolic name in a language such as a word, a list of words or a phrase, a character string, a query, a sub-component of a query, a topic, or the name of a document category. As the present disclosure involves natural languages, and makes references to certain grammatical terms such as a "sentence", and the "subject" and "predicate" of a sentence, it should be noted that the term "object" used in the present disclosure is different from the grammatical term of "object" that refers to the object of a transitive verb, such as a noun or a pronoun. In the present disclosure, this sense of "object" is not used.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a keyboard, as shown in FIG. 1. The property "CPU" having an association-strength of "0.99" is a more defining feature to the object "computer" than the property "case" that has an association-strength value of "0.2".

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."

1B "John is intelligent."

"John" is the subject of the sentences, while "is a student" and "is intelligent" are respectively the predicates of 1A and 1B.

In OPAM of the present invention, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate".

In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In OPAM of the present invention, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure.

In conventional grammar, a compound sentence is a sentence that contains two or more independent clauses, or non-embedded clauses, such as "John is a student, and Mary is a teacher." in which the two clauses do not contain each other. In the present disclosure, the term "complex sentence" refers to both the complex sentence and the compound sentence.

A document can include one or more paragraphs. Each paragraph can include one or more simple and/or complex sentences.

Given the information structure of a simple sentence as being "Object O is associated with Property P", the amount of information a linguistic content may carry also depends on which of the properties of the object is being associated with the object. Compare the following:

2A. "A computer has a CPU."

2B. "A computer has a case."

Sentences 2A and 2B may not convey new information about the object of computer to someone having basic knowledge about computers. When asked: "Which of the sentences is more informative about the object of computer?" however, the same person would very likely choose 2A as the more informative one. This example shows that for the same object and to the same receiver of a message, different properties carry different amounts of information about the object. In this example, "CPU" is a more defining feature than "case" for the object "computer".

The sentence "A computer has a CPU and a hard disk." contains more information about the object "computer" than the sentence 2A. A document consists of two sentences such as "A computer has a CPU. And it also has a hard disk." contains more information about the object of "computer" than a document that consists of only one single sentence such as "A computer has a CPU." This is the cumulative or incremental nature of the amount of information in a linguistic content.

In the presently disclosed system and methods, the information contained in a text document about an object is quantitatively assessed by analyzing sentences in the document. Each sentence can carry different amount of information about a specific object.

As is shown above, judgment of the amount of information in a document can be subjective, or the measurement can be relative, depending on one's prior knowledge. In the presently disclosed system and methods, it is not required for the assessing system to have prior knowledge about the object. In some embodiments, the disclosed system and methods can assume an initial knowledge in the assessing system as a relative standard. In some other embodiments, in order to establish an absolute or objective standard for measuring the quantity of the information in a linguistic content, such initial knowledge is set to zero. Thus, in the example of a simple sentence, such as "Object O has property P", anything that can be a property of the object, or that can appear in the position of P is assumed to carry potential information of certain amount about the object O.

Figure 2:
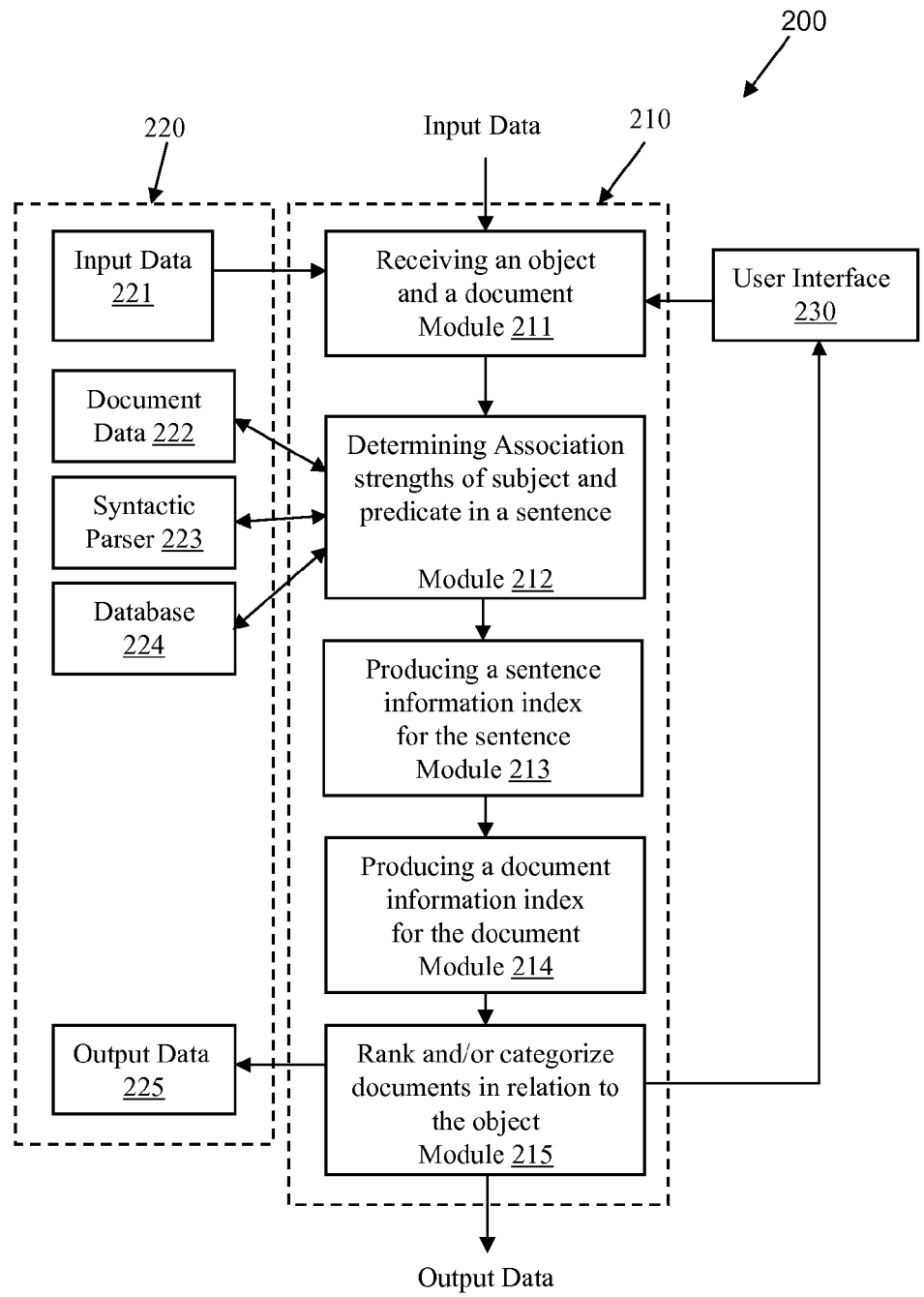
FIG. 2 is an exemplified system diagram in accordance with the present invention.

Referring to FIG. 2, a system 200 for quantitatively assessing information in natural language contents includes a computer processing system 210, a computer storage system 220, and a user interface 230. The computer processing system 210 includes algorithmic applications that further include functional modules 211-215 for conducting quantitative assessment of information in natural language contents. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone or a personal digital assistant, a computer network system comprising servers and processors that can provide information service to a remote server or client machine, and a cloud computing system. The computer storage system 220 can store, as described in more detail below, input data 221, document data 222 comprising one or more documents, optionally a syntactic parser 223, a database 224, and output data 225. The computer storage system 220 can be implemented in many types of storage media based on magnetic, optical, and mechanical properties, and nano materials, which can include a hard drive and an array of hard drives, flash memory, optical disks, and magnetic tapes. The user interface 230 can be provided, for example, by a program installed on a computer, a web browser, and an application for mobile devices.

The module 211 in the computer processing system 210 receives input data from an external source, input data 221 in the computer storage system 220, or the user interface 230. The input source can include a query from a web browser, a search text string entered by a user at a user interface (e.g. 230). The input data includes an object name and a document. The object name can be in the form of a word, a list of words or a phrase, a character string, a sub-component of such string. The object can be a physical object or an abstract object. The object name can be obtained from the input string, which can be or can contain a query, a topic, or the name of a document category. The document can include any document that includes text in a language, such as a web page, a menu, a book, an email, a text message, an article, a dictionary, an instruction manual, etc. The module 211 can first receive a path to one or more documents, and subsequently retrieves the one or more documents according to the path. The document(s) can be stored in document data 222 in the computer storage system 220.

The computer storage system 220 can optionally include a syntactic parser 223. A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser 223 can be used to divide a simple sentence into a subject and a predicate. As it is known, a syntactic parser may not always produce a structural description of a sentence that conforms to the understanding by human language users. In some cases, a syntactic parser may fail to produce a meaningful description. Alternative approaches to the syntactic parser 223 are disclosed below to address such extreme cases.

In the present disclosure, the subject or the predicate in a sentence can be in the form of a single word, a string of words or a phrase, or an embedded clause.

The database 224 in the computer storage system 220 stores names of a plurality of objects, the names of the properties for each object, and association-strength values of each property for an object. The object names, the property names, and the association-strength values can be stored in a table form, as shown in FIG. 1, or in other data structures. In the present invention, the association strength of a property to a given object is a measure for the amount of information that the property potentially carries for the object. The amount of information that is actually realized, to be discussed in detail below, can depend on the context in which the property term occurs. The above described database can be called a Knowledge Base because it stores knowledge about associations among objects and properties. The database 224 can be constructed automatically, semi-automatically, and/or by manual input. As discussed previously, the association strength for a property is dependent on the object of interest, thus the association strength can also be referred to as Object-Dependent Association Strength.

Figure 3:
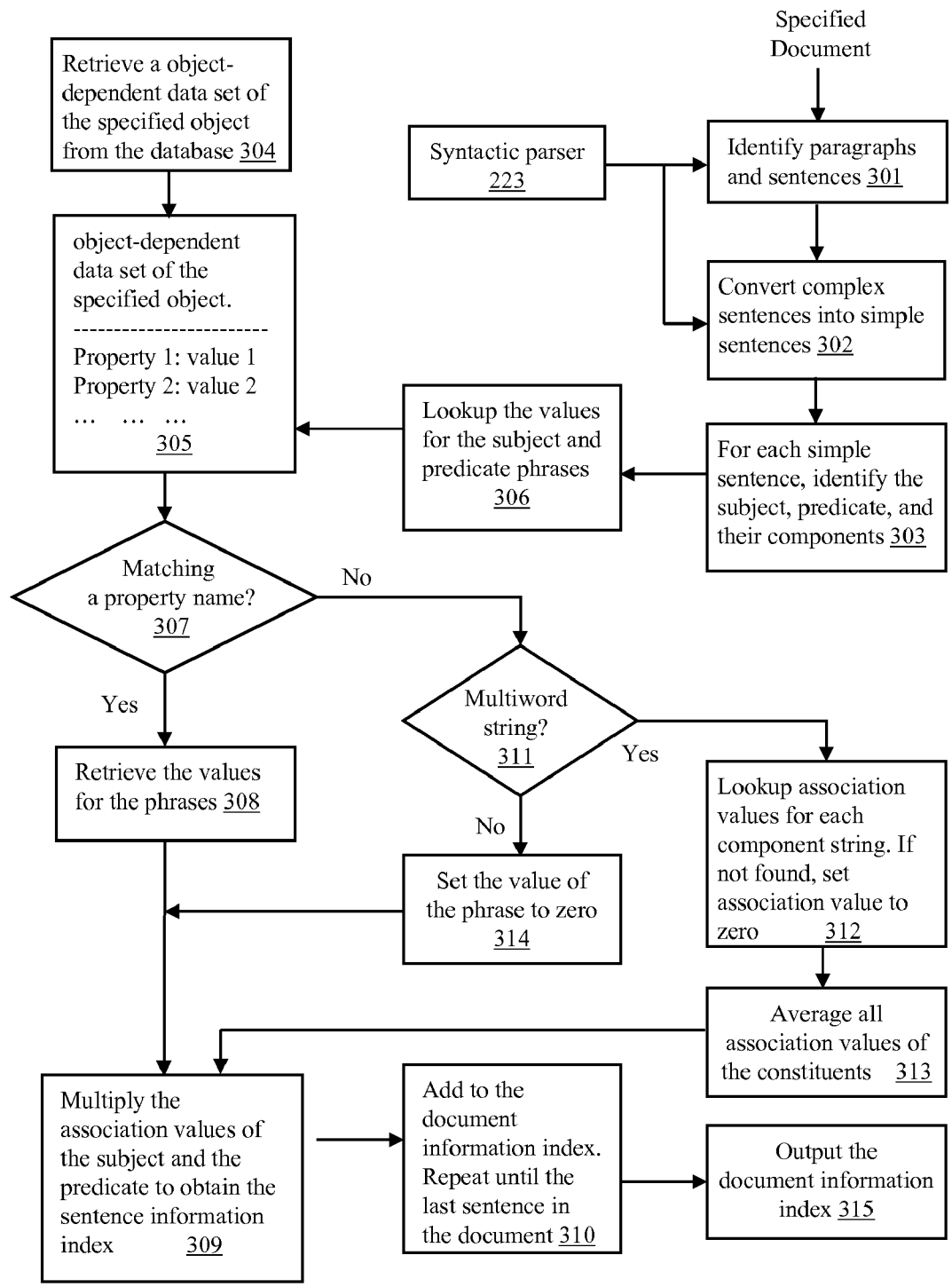
FIG. 3 illustrates detailed steps for quantitatively assessing information in the specified document for the specified object in FIG. 2.

FIG. 3 illustrates detailed steps conducted by the modules 212-214 in FIG. 2. Referring to FIG. 3, the syntactic parser 223 is applied by the module 212 (FIG. 2) to parse the specified document to produce a list of paragraphs and sentences (step 301). Complex sentences in the specified document, if any, are next converted into simple sentences as described above (step 302). For each simple sentence, the module 212 identifies a subject and a predicate and returns two labeled text strings: a subject string and a predicate string (step 303). On the other hand, the module 212 retrieves an object-specific data set associated with the specified object name from the database 224 (step 304). The object-specific data set (step 305) includes a plurality of properties and corresponding association-strength values specific to the object. Next, the subject and the predicate obtained in step 303 are searched against the property names in the object-specific data set to determine if a property name in the object-specific data set matches the subject or the predicate of the sentence (step 305). If such a match is found for the subject or the predicate (step 307), the association-strength value for the subject or the predicate in the sentence is retrieved from the object-specific data set (step 308). The association-strength values of the subject and the predicate of the sentence are then multiplied to obtain a sentence information index by the module 213 (FIG. 2) (step 309). The sentence information index obtained in step 309 is added to a document information index by the module 214 (FIG. 2) (step 310).

As is described above, the association strength values of the subject and the predicate are the information potentials they carry about the specific object. The mathematical operation of multiplication of the two values in step 309, in the present invention, is one of the means of realizing such information potentials in the context of a subject and a predicate. And the mathematical operation of adding the sentence information index to produce a document information index (step 310) is one of the means of integrating the cumulative or incremental nature of the amount of information in a linguistic content as described earlier.

If no property name in the object-specific data set for the object name is found to match the subject or the predicate string of the sentence (step 307), the non-matching phrase string is analyzed to see if it is a multiword string (step 311). If the non-matching phrase string is a multiword string, the association strength of each of its components or sub-strings is looked up from the object-specific data set (step 312). If a match for a sub-string is found, the association-strength value for that sub-string is retrieved from the data set (step 312). If a match for a sub-string is not found, the association-strength value for that sub-string is set to zero (also in step 312). The association strength of the multiword phrase string can be derived by averaging the association-strength values of all the sub-strings (step 313), or by further analyzing the internal structure of the phrase using a syntactic parser (steps 420 to 470). The derived association-strength value of the multiword phrase string is used to calculate the sentence information index (step 309). If the subject or the predicate phrase string is not a multiword string (step 311), the value of the phrase is set to zero (step 314), which will produce a zero-valued sentence information index (step 309).

The steps 306-309 and 311-314 are repeated to the next sentence in the document until all the sentences in the document are analyzed (step 310). As described above, the amount of information in a linguistic content is cumulative or incremental in nature. The final document information index is a sum of the sentence information index in the document, and is output by the module 214 to the module 215 (FIG. 2) (step 315).

In some embodiments, the sentence information index can be obtained by using different formulae than the simple multiplication of the association-strength values of the subject and predicate of a sentence. For example, different coefficient values can be used for the subject and the predicate, respectively, when the two association strength values are multiplied, reflecting the weight difference in the subject position and the predicate position. The document information index also may not be a linear sum of the sentence information indices of the sentences in the document. The document information index can be non-linearly dependent on either the sentence information indices or the paragraph information indices which can in turn be non-linearly dependent on the sentence information indices in the document.

As is described earlier, a complex sentence is a sentence that contains other sentences or clauses as its components, and each such component clause can eventually be reduced to and expressed in the form of a simple sentence of Subject+ Predicate. Thus, the information structure of O+P of a simple sentence can also hold for the lower level clauses in a complex sentence, and the above described methods for simple sentences can be recursively applied to the components of a complex sentence, and the information index of a complex sentence can be produced by summing up the information indices of its component sentences, or by alternative formulae as described above.

A phrase in a language can be a simple phrase, such as a single word, or a complex phrase of multiple words. In linguistics, a complex phrase is usually a phrase consisting of a head and one or more modifiers of the head. For example, in the complex phrase of "digital cameras", the word "camera" is the head, and "digital" is a modifier. In the OPAM model of the present disclosure, the head is treated as the name of an object (or a class of similar objects), and a modifier is treated as the name of a property of the object or class. The complex phrase of "digital cameras" is the name of a subclass of cameras that all have the property of being digital in nature, and has the information structure of "an object (class) O that has the property of P. A head can be a multiword phrase, such as "New York", and a modifier can also be a multiword phrase, such as "North West" in a complex phrase of "North West New York". With the information structure of a complex phrase also being O+P, the above described methods for calculating the information index for a simple sentence can also be recursively applied to a complex phrase to produce the information index of the phrase by retrieving from the object-specific data set the respective association strength values for the head and the modifier, and then multiplying the two values, optionally with an coefficient as an adjustment for complex phrases as incomplete sentences.

A simple sentence with complex phrases as both its subject and predicate may have the information structure of "The object O that has property P has the property PP that has the property PPP", where the information structure of the subject of the sentence is "The object O that has property P", and the information structure of the predicate of the sentence is "has the property PP that has the property PPP".

Figure 4:
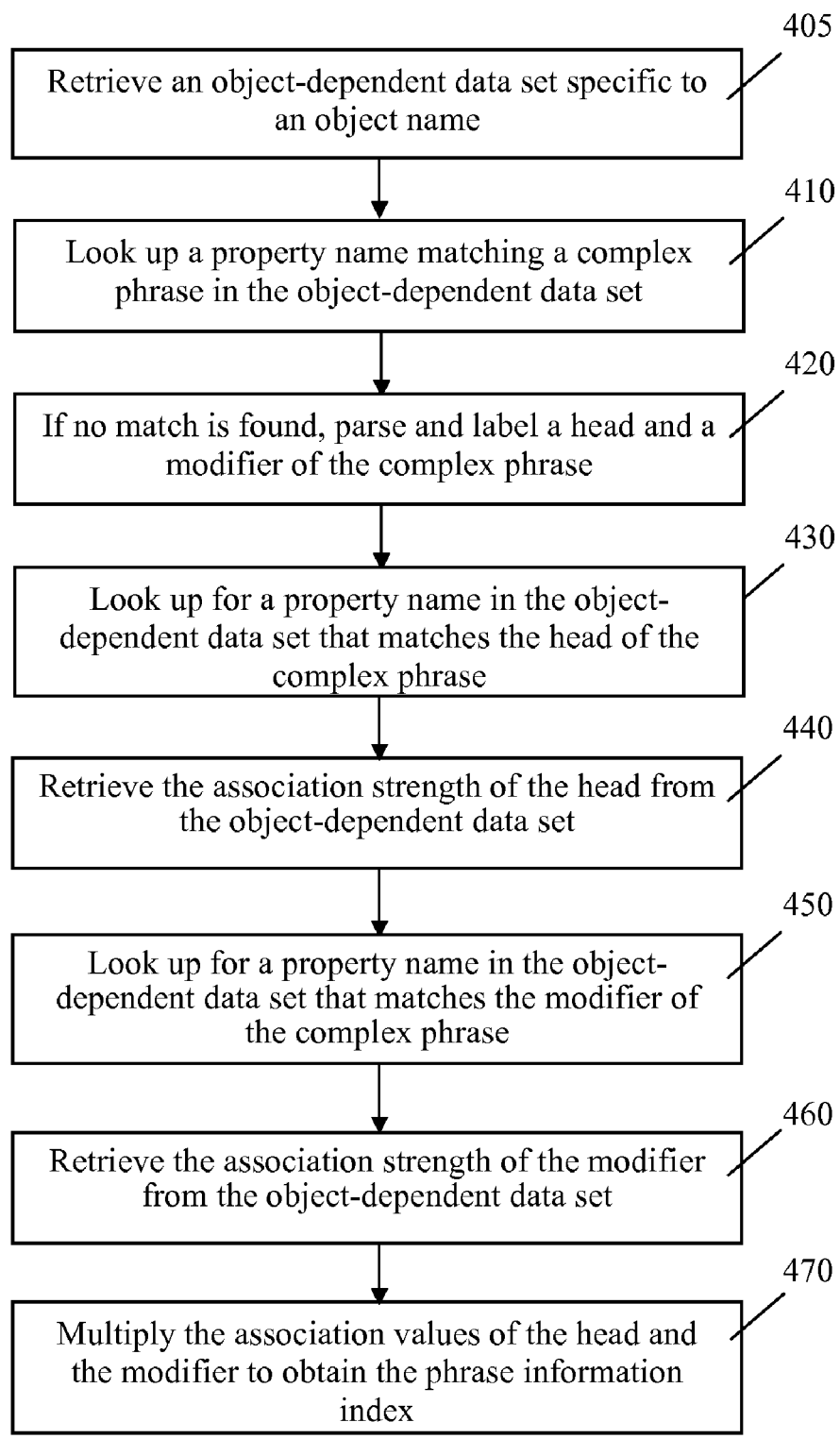
FIG. 4 illustrates another exemplified method for quantitatively assessing information in phrases and sentences.

In some embodiments, referring to FIG. 4, complex phrases in a simple sentence can be analyzed using steps shown in FIG. 4 as an alternative to steps 311 to 313 in FIG. 3. An object name is determined and an object-dependent data set specific to the object name is retrieved (step 405). The object-specific data set, as described above, is specifically related to the object name. A property name is looked up in the object-specific data set for the complex phrase (e.g. "digital camera") (step 410). If a match is found, the complex phrase can be treated as a simple property name as discussed in steps 305-315. If no match is found, the complex phrase is parsed to a head (e.g. "camera") and a modifier (e.g. "digital") (step 420). Next, a property name is looked up in the object-specific data set that matches the name of the head of the complex phrase (step 430). The association-strength value for the head is retrieved from the object-specific data set (step 440). A property name is looked up in the object-specific data set that matches the name of the modifier of the complex phrase (step 450). The association-strength value of the modifier is then retrieved from the object-specific data set (step 460). The association-strength values of the head and the modifier are multiplied to produce the phrase information index (step 470), which can be a quantitative measurement of the amount of information contained in the phrase about the specific object, and which can also subsequently be used as the derived association strength of the phrase to the specific object to calculate the sentence information index, and then the document information index.

If the head or the modifier of a complex phrase does not find a match in the object-specific data set, and the head or the modifier is a multiword phrase, the parser can continue to analyze the components of the multiword phrases, and recursively apply the above method. However, the presently disclosed system and methods also provide alternative embodiments as described below.

The accuracy of syntactic parsers in general tends to decrease and the computation intensity tends to increase as the complexity of the sentence structure increases. In some cases, a syntactic parser can fail to produce a correct structural description of a complex phrase or a complex sentence. To handle these situations, the presently disclosed system and methods provide an alternative to the above described parser-based recursive structural analysis of complex sentences and complex phrases (as shown in steps 302 and 303 in FIG. 3, and 420 to 470 in FIG. 4). The alternative approach derives the association-strength value of a complex subject or predicate phrase by averaging the association-strength values of its component terms when an exact match of the complex phrase is not found in the database (shown in steps 311 to 314 in FIG. 3). In other words, instead of recursively applying the syntactic parser to label the internal structure of the two phrases, components in the subject and predicate phrases can be looked up in the object-specific data set without applying the syntactic parser to label the head and the modifier of the phrase. If the association-strength values of the components are found in the object-specific data set, then the average of the association-strength values is used as the derived association strength for the subject or the predicate phrase.

For example, in response to an object name "computer" in a query, a syntactic parser returns the subject of a sentence as "The computer with 4 GB of memory" and the predicate of the sentence as "has a Unix operating system." A search in the object-specific data set for the object "computer" does not result in a match for either of the complex phrases. Instead of recursively applying a syntactic parser to identify the head and the modifier in the phrase, with the alternative approach, each word or combinations of words in the subject phrase "The computer with 4 GB of memory" are looked up for their corresponding association-strength values from the object-specific data set for the object "computer". The association-strength values for the eight component terms or for combinations of such component terms are averaged to produce the derived association-strength value for the subject phrase.

Figure 5:
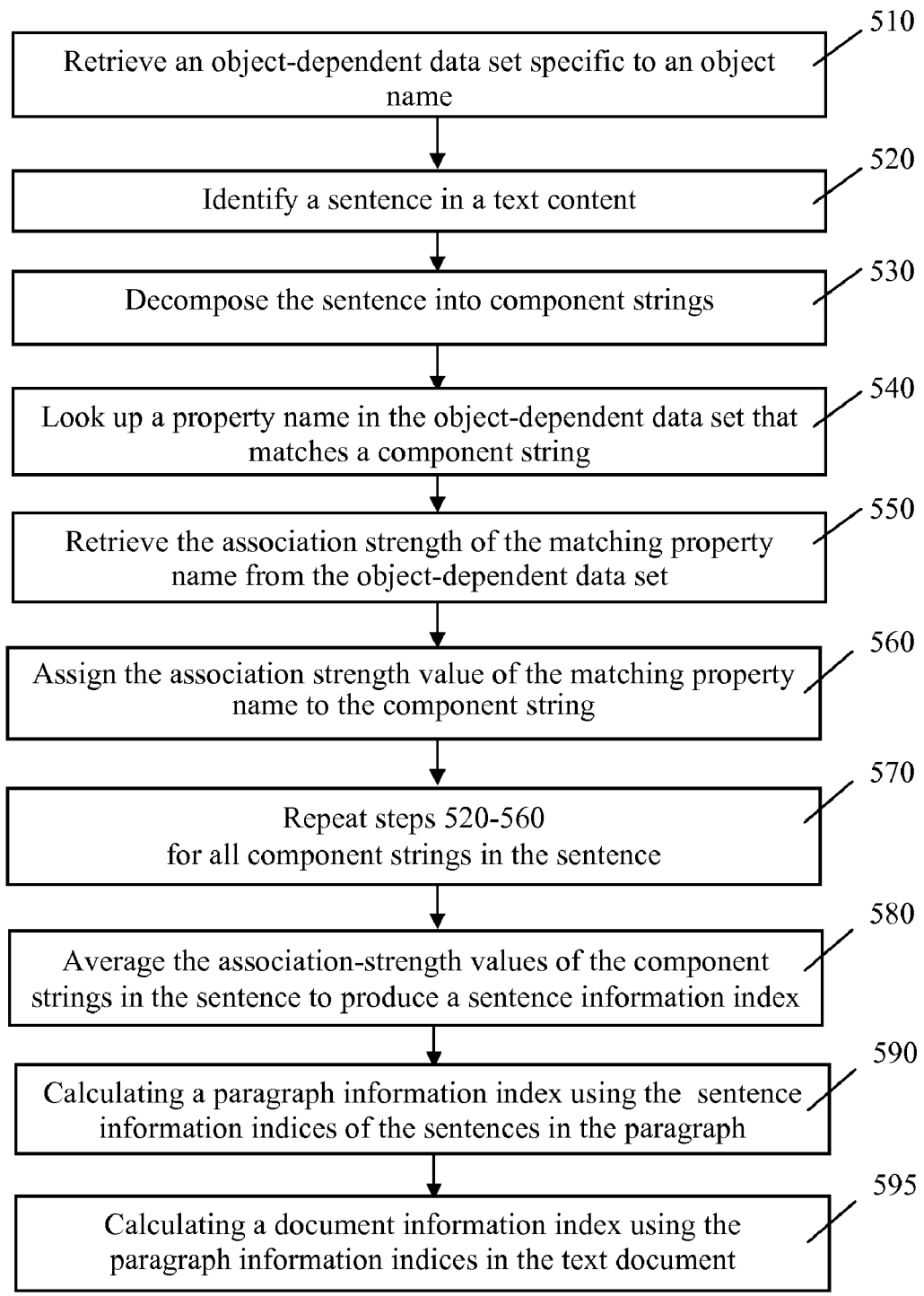
FIG. 5 illustrates another exemplified method for quantitatively assessing information in a text content.

In some embodiments, the disclosed system and methods do not employ a syntactic parser. In this case, the subject and the predicate are not required to be identified in a sentence. Referring to FIG. 5, an object name is determined and an object-dependent data set specific to an object name is retrieved (step 510). A sentence is identified by appropriate punctuation marks of a text document in a natural language (step 520). A sentence is treated as a text string. The text string is decomposed into component strings (step 530). A component string can include a single word, a phrase, or combinations of word sequences of different lengths. For each such component string in the sentence, a property name matching component string is looked up in the object-specific data set (step 540). If a match is found, the association-strength value for the property name matching the component string is retrieved from the object-specific data set (step 550). The association strength value for the matching property name is assigned to the component string (step 560). Steps 530-560 are repeated for all component strings in the sentence (step 570). The association-strength values of such component strings in the sentence are averaged to produce a sentence information index for the sentence (step 580). Various coefficients, such as the relative positions of component strings in the sentence, can be used as the component string's weight to produce a weighted average. For each sentence in a paragraph, the sentence information index of the sentence is added up to produce a paragraph information index for the paragraph (step 590). The paragraph information indices of the paragraphs in the text document are added up to produce a document information index of the document (step 595). In some cases, the document information index can be calculated directly using the sentence information indices zo of the sentences in the text document.

In some embodiments when a syntactic parser is not used, the disclosed system and methods do not require a sentence to be identified by punctuation marks. The entire document or a paragraph is treated as a flat text string. The text string is broken down into component strings such as words and phrases, including combinations of word sequences of different lengths. Each such component string in the document or a paragraph is looked up in the object-specific data set. The corresponding association-strength values are retrieved. In addition to using a simple average of all the association-strength values of such component strings in the document or a paragraph as their respective information index, various coefficients, such as the frequency a component string occurs in the document or a paragraph, and/or the relative positions of component strings in the document, can be used as the component string's weight to produce a weighted average as the information index of the document or a paragraph. If a user prefers, paragraphs can be used as the text unit for information measurement; and the information index of each paragraph can be added up to produce the information index of the document. In certain cases, a document can have only one paragraph, and a paragraph can have only one sentence, or one or more character strings.

These methods have been found to be cost effective, especially when lower precision in the information measurements can be tolerated, such as in classifying documents into very distinctive classes, and can handle cases when the syntactic parser completely fails or when no syntactic parser is employed.

The disclosed system and methods can be applied to a number of areas such as document relevance ranking for search engines, automatic document classification or categorization of unstructured data, and providing contextual information for meaning disambiguation in natural language processing, machine translation, and speech recognition, etc.

Referring again to FIG. 2, the module 214 sends the document information index of one or multiple specified documents to the module 215 in the computer processing system 210. The module 215 can perform one or more of the following exemplified operations. The output data can be stored in output data 225 or to other external sources Document Relevance Ranking for Search Engines Some conventional ranking algorithms are mainly based on keywords, links, or popularity, and do not make direct reference to the information structure in the document contents. The presently disclosed system and methods are capable of producing better relevancy-ranking results than such conventional algorithms. When a user issues a search query, it is interpreted in the presently disclosed system and methods as that the user is looking for information about one or more objects by stating the object names in the query. The presently disclosed system and methods can quantitatively measure the amount of information contained in each document in the document collection, and rank the documents by the amount of information they contain about the queried object, thus providing information to the users in a more accurate and effective way. The collection of documents can include the Web pages on the Internet, documents stored in a company, an organization, and on an individual user's computer.

In the module 215, if a query matches a single object name, documents in a collection can be quantitatively evaluated for this object name using the process described above. The document information indices thus obtained about the object name as queried in the search can be used as a quantitative measure of the degree of relevancy of the documents to the query. The documents can be rank ordered according to their document information indices in the search result in the output data, which can allow a user (i.e. the inquirer) to look at documents more relevant to his or her query first.

If a query does not match a single object name but contains multiple object names, the same document collection can first be evaluated against each object name contained in the query for the amount of information each of the documents contains about each of the objects, and then a combined score can be derived based on the information index of each document about each object as the relevancy score of that document to the query. The documents can then be rank ordered according to their combined score in the search result.

Document Classification

The presently disclosed system and methods can intelligently classify documents. Once the document information indices of documents are obtained by the module 214 and received by the module 215, documents with their document information indices above a set threshold can be treated as belonging to a category defined by the object name, and stored in the output data. For example, if the class object name is "computer" or "finance", all documents with their document information indices for the object "computer" above a pre-determined threshold can be classified into the "computer" category. Documents with document information indices for the object "finance" above a pre-determined threshold can be classified as belonging to the "finance" category. The thresholds for different categories (i.e. different objects) can be the same or different.

In the presently disclosed system and methods, a document can be classified into one or more categories based on the amount of information obtained by module 214 and received by module 215 for different objects that correspond to different categories. The object name used to classify documents can be the name of a document category, or a name related to a document category. Depending on the user preference of classification, and the pre-determined thresholds, a single document may or may not belong to multiple categories.

A well-defined category system can include mutually exclusive categories, such as a category system for computer operating systems, which can have mutually exclusive sub-categories of Windows, Macintosh, UNIX, etc. If a document is solely about Windows operating system, then it is likely to have a near-zero information index for the object name of UNIX or Macintosh, and will exclusively be classified into the category of Windows. However, if the document's main topic or content is about the differences between Windows and UNIX, then it is likely to have an above-threshold information index value for the object of Windows, and also an above-threshold information index value for the object of UNIX, and can be classified into both the categories of Windows and UNIX. This way, relevant information can be easily accessed from the respective categories.

Meaning Disambiguation in Language Understanding, Machine Translation, and Speech Recognition The presently disclosed system and methods can be applied to meaning disambiguation in computer understanding of natural language. A word in a natural language can have multiple meanings in that language. For example, the English word of "bank" can mean a bank as a financial institution, or the bank of a river. These words are ambiguous without context information. If a language understanding program only looks up its meaning from a dictionary, there are more than one potential candidate meanings to choose from. The machine is often faced with a decision about which meaning is the correct one for the context. In some conventional technologies, the decision is either based on a statistically obtained probability of the word as being used in the English language, a method that is not so reliable, or based on available context information, which is usually very difficult to obtain by machines alone.

The presently disclosed system and methods can effectively identify the most appropriate meanings of such words in their context. The context can be a phrase, sentence, a paragraph, or multiple paragraphs, or even the entire document. An information index for the sentence, or the paragraph or paragraphs, or the document for each meaning of the word can be computed. The word meaning having the highest score can be selected as the most appropriate meaning in that context.

For example, suppose the dictionary lists two meanings of the word "bank".

(1) A financial institution that handles monetary transactions.

(2) A raised boarder along a river.

If the sentence is:

(3) "The bank has enough money."

the presently disclosed system and methods can calculate sentence information indices for sentence (3) for both of the object name of "financial institution" and "river". The sentence information index will be much higher for "financial institution" than that for "river" because a term such as "money" in the sentence has a higher association-strength value for the object of "financial institution" than for the object of "river".

The above described meaning disambiguation can be applied to many areas. One such area is machine translation. As described above, a word or a phrase in a natural language may have more than one meaning. In order for a machine to properly translate a text content, a context is often needed to determine which of the multiple meanings of a word is the intended meaning or the most appropriate meaning. The presently disclosed system and methods can compute information indices for various contexts as exemplified above, and select the context that has the highest information index as the most appropriate meaning The described meaning disambiguation methods can also be applied to computer natural language understanding and speech recognition to correctly identify the most appropriate meaning of a multi-meaning word or phrase, thus providing a solution to a key issue in these areas.

It should be understood that the above-described methods are not limited to the specific examples used. Configurations and processes can vary without deviating from the spirit of the invention. The methods for quantitative assessment of information in the natural language contents can be applied to areas in addition to the examples described above, including non-natural or artificial languages such as a computer programming language, or a symbolic system in which symbols that carry a meaning are used. In the case of natural language, various types of sentence structures and phrase structures exist. While they are not exhaustively exemplified in the above description, the information structure of "Object+Properties" and the corresponding information quantification methods as described in the present disclosure should apply to any type of sentence or phrase structure. The above described techniques can be separately applied or when appropriate, applied in combination.

Moreover, the association strength can be expressed in the form of a continuous scale of numerical values or in the form of discrete ranges. The values of association strengths can be in a range between 0 and 1, and/or in other ranges. It should be understood that information indices can be defined at different levels than the examples described above. In addition to document, sentence, and phrase information indices, information index can be defined and computed for paragraphs, a string of words, or other segments of text.

What is claimed is:

1. A method for quantitatively assessing information in natural language contents, comprising:

receiving an object name by a computer processing system;

receiving, by the computer processing system, a document containing text in a natural language;

identifying a sentence in the document by the computer processing system;

dividing the sentence into a subject and a predicate by the computer processing system, wherein the predicate is defined as the portion of a sentence other than the subject;

retrieving an object-specific data set related to the object name from a computer storage system, wherein the object-specific data set includes a plurality of property names and association-strength values, each property name being associated with an association-strength value;

identifying a first property name in the plurality of property names that matches the subject;

assigning a first association-strength value associated with the first property name to the subject;

identifying a second property name in the plurality of property names that matches the predicate;

assigning a second association-strength value associated with the second property name to the predicate; and multiplying the first association-strength value and the second association-strength value by the computer processing system to produce a sentence information index as a quantitative measure for the amount of information contained in the sentence about the object name.

2. The method of claim 1, further comprising:

computing a document information index using the sentence information index, wherein the document information index is a quantitative measure for the amount of information contained in the document about the object name.

3. The method of claim 2, wherein the step of computing the document information index comprises:

computing sentence information indices of a plurality of sentences in the document, wherein the sentence information indices are specific to the object name; and computing the document information index as a function of the sentence information indices.

4. The method of claim 3, wherein the step of computing the document information index comprises:
  summing up the sentence information indices to produce the document information index.

5. The method of claim 2, further comprising:
  receiving a query related to the object name by the computer processing system; computing document information indices for a plurality of documents, wherein the document information indices each is a quantitative measure for the amount of information contained in the document about the object name; and
  ranking the plurality of documents by their respective document information indices to produce a search result in response to a query.

6. The method of claim 2, further comprising:
  receiving an object name to classify documents by the computer processing system; computing document information indices for a plurality of documents, wherein the document information indices each is a quantitative measure for the amount of information contained in the document about the object name;
  determining a threshold value for a document category related to the object name;
  selecting one or more documents from the plurality of documents by comparing their respective document information indices to the threshold value; and
  assigning the one or more documents to the document category.

7. The method of claim 6, further comprising:
  determining a threshold value for a document category related to the object name;
  selecting one or more documents from the plurality of documents if the document information indices of the one or more documents are above or equal to the threshold value;
  assigning the one or more documents to the document category.

8. The method of claim 1, further comprising:
  assigning a zero value to the sentence information index if a property name matching the subject or the predicate is not identified in the plurality of property names in the object-specific data set.

9. The method of claim 1, wherein the subject or the predicate in the sentence comprises a single word, a string of words, a phrase, or an embedded clause.

10. The method of claim 1, wherein the subject and the predicate in the sentence are determined by the computer processing system using a syntactic parser.

11. The method of claim 1, wherein the object name includes a word, a list of words, a phrase, a character string, a query, a sub-component of a query, a topic, or the name of a document category.

12. The method of claim 1, wherein the step of identifying a sentence in the document comprises:
  identifying a complex sentence in the document by the computer processing system;
  decomposing the complex sentence into one or more simple sentences, wherein a subject and a predicate are identified in each of the simple sentences by the computer processing system;
  calculating sentence information indices for the one or more simple sentences; and
  computing a sentence information index for the complex sentence using the sentence information indices for the one or more simple sentences.

13. A method for finding text documents relevant to a search query, comprising:
  receiving a search query related to an object name by a computer processing system;
  receiving, by the computer processing system, a plurality of documents each containing text in a natural language;
  retrieving an object-specific data set related to the object name from a computer storage system, wherein the object-specific data set includes a plurality of property names and association-strength values, each property name being associated with an association-strength value;
  computing a document information index for each of the plurality of documents, wherein the document information index is a quantitative measure for the amount of information contained in the document about the object name; and
  ranking the plurality of documents by their respective document information indices to produce a search result in response to the search query,
  wherein the step of computing a document information index comprises:
    identifying a sentence in the document by the computer processing system;
    dividing the sentence into a subject and a predicate by the computer processing system, wherein the predicate is defined as the portion of a sentence other than the subject;
    identifying a first property name in the plurality of property names in the object-specific data set that matches the subject;
    assigning a first association-strength value associated with the first property name to the subject;
    identifying a second property name in the plurality of property names in the object-specific data set that matches the predicate;
    assigning a second association-strength value associated with the second property name to the predicate;
    multiplying the first association-strength value and the second association-strength value to produce a sentence information index; and
    calculating the document information index using the sentence information index.

14. The method of claim 13, wherein the document information index is calculated by summing up sentence information indices calculated for sentences identified in the document.

15. A method for classifying text documents in a natural language, comprising:
  receiving, by the computer processing system, an object name for document classification;
  receiving, by the computer processing system, a plurality of documents each containing text in a natural language;
  retrieving an object-specific data set related to the object name from a computer storage system, wherein the object-specific data set includes a plurality of property names and association-strength values, each property name being associated with an association-strength value;
  computing a document information index for each of the plurality of documents, wherein the document information index is a quantitative measure for the amount of information contained in the document about the object name;
  selecting one or more documents relevant to the object name from the plurality of documents using their respective document information indices; and assigning the one or more documents to a document category related to the object name,
wherein the step of computing a document information index comprises:
identifying a sentence in the document by the computer processing system;
dividing the sentence into a subject and a predicate by the computer processing system, wherein the predicate is defined as the portion of a sentence other than the subject;
identifying a first property name in the plurality of property names in the object-specific data set that matches the subject;
assigning a first association-strength value associated with the first property name to the subject;
identifying a second property name in the plurality of property names in the object-specific data set that matches the predicate;
assigning a second association-strength value associated with the second property name to the predicate;
multiplying the first association-strength value and the second association-strength value to produce a sentence information index; and
calculating the document information index using the sentence information index.

16. The method of claim 15, further comprising:
determining a threshold value for a document category related to the object name;
selecting one or more documents from the plurality of documents if the document information indices of the one or more documents are above or equal to the threshold value;
assigning the one or more documents to the document category.

17. A method for quantitatively assessing information in a text content about an object name, comprising:
receiving an object name by a computer processing system;
retrieving an object-specific data set related to the object name from a computer storage system, wherein the object-specific data set includes a plurality of property names and association-strength values, each property name being associated with an association-strength value;
receiving, by the computer processing system, a text content in a natural language;
identifying a sentence in the text content;
identifying a plurality of component strings in the sentence by the computer processing system;
searching for a property name in the plurality of property names that matches at least one of the component strings;
assigning an association-strength value associated with the property name to the one of the component strings;
averaging, by the computer processing system, the association-strength values assigned to the component strings in the sentence to produce a sentence information index; and
calculating an information index for the text content using the sentence information index, wherein the information index is a quantitative measure for the amount of information contained in the text content about the object name.

18. A system for quantitatively assessing information in natural language contents, comprising:
a computer processing system configured to receive an object name and a document containing text in a natural language; and
a computer storage system in communication with the computer processing system and configured to store an object-specific data set related to the object name from wherein the object-specific data set includes a plurality of property names and association-strength values, each property name being associated with an association-strength value,
wherein the computer processing system is configured to identify a sentence in the document, divide the sentence into a subject and a predicate, wherein the predicate is defined as the portion of a sentence other than the subject, identify a first property name in the plurality of property names that matches the subject, assign a first association-strength value associated with the first property name to the subject, identify a second property name in the plurality of property names that matches the predicate, assign a second association-strength value associated with the second property name to the predicate; and multiply the first association-strength value and the second association-strength value to produce a sentence information index as a quantitative measure for the amount of information contained in the sentence about the object name.

19. The system of claim 18, wherein the computer processing system is further configured to compute a document information index using the sentence information index, wherein the document information index is a quantitative measure for the amount of information contained in the document about the object name.

20. The system of claim 19, wherein the computer processing system is further configured to sum up the sentence information indices computed for sentences in the document to produce the document information index.

* * * * *